United States Patent
Abrams

(10) Patent No.: US 8,244,827 B2
(45) Date of Patent: Aug. 14, 2012

(54) TRANSFERRING A LOGICAL PARTITION ('LPAR') BETWEEN TWO SERVER COMPUTING DEVICES BASED ON LPAR CUSTOMER REQUIREMENTS

(75) Inventor: Roger K. Abrams, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 11/960,629

(22) Filed: Dec. 19, 2007

(65) Prior Publication Data
US 2009/0164660 A1 Jun. 25, 2009

(51) Int. Cl.
G06F 12/00 (2006.01)
G06F 11/30 (2006.01)

(52) U.S. Cl. ...................................................... 709/215

(58) Field of Classification Search .......... 709/230–237; 711/129, 170
See application file for complete search history.

(56) References Cited

U.S. PATENT DOCUMENTS

| | | | |
|---|---|---|---|
| 6,463,454 B1 | 10/2002 | Lumelsky et al. | |
| 6,957,433 B2 | 10/2005 | Umberger et al. | |
| 6,993,762 B1 | 1/2006 | Pierre | |
| 7,673,110 B2* | 3/2010 | Yamamoto et al. | 711/165 |
| 2002/0069369 A1* | 6/2002 | Tremain | 713/201 |
| 2003/0144894 A1* | 7/2003 | Robertson et al. | 705/8 |
| 2005/0228618 A1* | 10/2005 | Patel et al. | 702/188 |
| 2005/0251802 A1 | 11/2005 | Bozek et al. | |
| 2006/0206891 A1 | 9/2006 | Armstrong et al. | |
| 2006/0224741 A1* | 10/2006 | Jackson | 709/226 |

OTHER PUBLICATIONS

Hill; Storage & Servers; Network Computing; Dec. 2006; pp. 39-46; vol. 17, No. 26; CMP Media Inc.; USA.
McCune, et al.; Shamon: A System for Distributed Mandatory Access Control; pp. 1-10; IBM Research.
Umeno, et al.; Development of Methods for Reducing the Spins of Guest Multiprocessors; Joho Shori Gakkai Ronbun Shi (Transactions of the Information Processing Society of Japan); Mar. 1995; pp. 681-696; vol. 36, No. 3.
Wood, et al.; Black-box and Gray-box Strategies for Virtual Machine Migration; pp. 1-14.

* cited by examiner

Primary Examiner — Ian N Moore
Assistant Examiner — Thai Nguyen
(74) Attorney, Agent, or Firm — Edward J. Lenart; Cynthia G. Seal; Biggers & Ohanian, LLP

(57) ABSTRACT

Methods, systems, and products are disclosed for transferring a logical partition ('LPAR') between two of a plurality of server computing devices based on LPAR customer requirements, the plurality of server computing devices connected together through a data communications network, the LPAR installed on one of the plurality of server computing devices, each server computing device having server operating capabilities, each server computing device associated with LPAR hosting costs for supporting LPARs, that include: identifying LPAR customer requirements for the LPAR, the LPAR customer requirements specifying customer criteria for operating the LPAR; selecting, from among the plurality of server computing devices, a server computing device to which to migrate the LPAR in dependence upon the server operating capabilities and LPAR hosting costs for at least one of the server computing devices and the LPAR customer requirements for the LPAR; and migrating the LPAR to the selected server computing device.

19 Claims, 4 Drawing Sheets

TRANSFERRING A LOGICAL PARTITION ('LPAR') BETWEEN TWO SERVER COMPUTING DEVICES BASED ON LPAR CUSTOMER REQUIREMENTS

BACKGROUND OF THE INVENTION

1. Field of the Invention

The field of the invention is data processing, or, more specifically, methods, apparatus, and products for transferring a logical partition ('LPAR') between two server computing devices based on LPAR customer requirements.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area in which computer software has evolved to take advantage of high performance hardware is a software tool referred to as a 'hypervisor.' A hypervisor is a layer of system software that runs on the computer hardware beneath the operating system layer to allow multiple operating systems to run on a host computer at the same time. Hypervisors were originally developed in the early 1970's, when company cost reductions were forcing multiple scattered departmental computers to be consolidated into a single, larger computer—the mainframe—that would serve multiple departments. By running multiple operating systems simultaneously, the hypervisor brought a measure of robustness and stability to the system. Even if one operating system crashed, the others would continue working without interruption. Indeed, this even allowed beta or experimental versions of the operating system to be deployed and debugged without jeopardizing the stable main production system and without requiring costly second and third systems for developers to work on.

A hypervisor allows multiple operating systems to run on a host computer at the same time by providing each operating system with its own set of computer resources. These computer resources are typically virtualized counterparts to the physical resources of a computing system. A hypervisor allocates these resources to each operating system using logical partitions. A logical partition, also referred to as a 'virtual machine,' is a set of data structures and services that enable distribution of computer resources within a single computer to make the computer function as if it were two or more independent computers. Using a logical partition, therefore, a hypervisor provides a layer of abstraction between a computer hardware layer of a computing system and an operating system layer.

SUMMARY OF THE INVENTION

Methods, systems, and products are disclosed for transferring a logical partition ('LPAR') between two of a plurality of server computing devices based on LPAR customer requirements, the plurality of server computing devices connected together through a data communications network, the LPAR installed on one of the plurality of server computing devices, each server computing device having server operating capabilities, each server computing device associated with LPAR hosting costs for supporting LPARs, that include: identifying LPAR customer requirements for the LPAR, the LPAR customer requirements specifying customer criteria for operating the LPAR; selecting, from among the plurality of server computing devices, a server computing device to which to migrate the LPAR in dependence upon the server operating capabilities and LPAR hosting costs for at least one of the server computing devices and the LPAR customer requirements for the LPAR; and migrating the LPAR to the selected server computing device.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
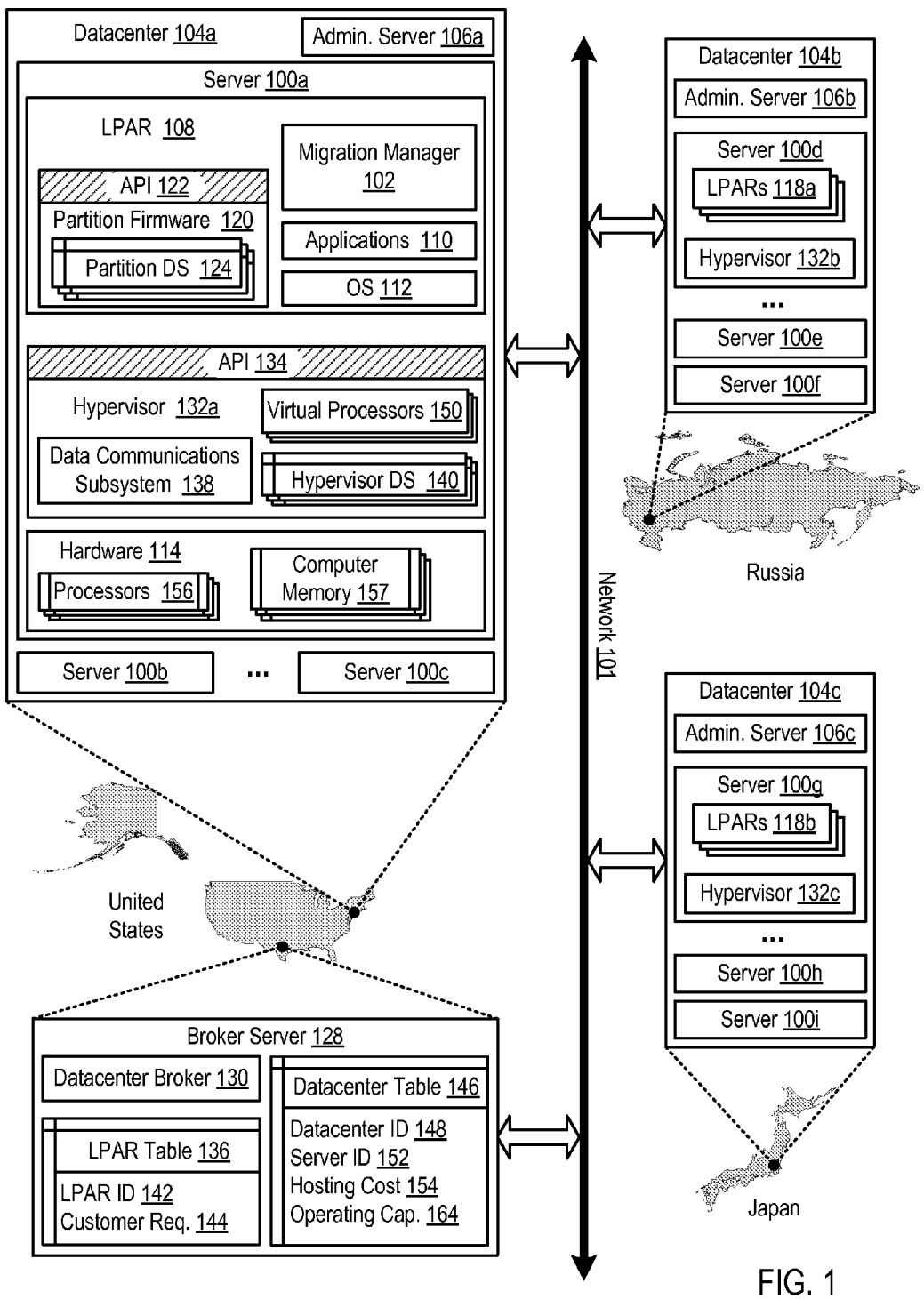
FIG. 1 sets forth a block diagram of an exemplary system for transferring a LPAR between two server computing devices based on LPAR customer requirements according to embodiments of the present invention.

Exemplary methods, apparatus, and products for transferring a logical partition ('LPAR') between two server computing devices based on LPAR customer requirements in accordance with the present invention are described with reference to the accompanying drawings, beginning with FIG. 1. FIG. 1 sets forth a block diagram of an exemplary system for transferring a LPAR (108) between two of a plurality of server computing devices (100) based on LPAR customer requirements (126) according to embodiments of the present invention. The server computing devices (100) of FIG. 1 are connected together through a data communications network (101). Each server computing device (100) has server operating capabilities and is associated with LPAR hosting costs for supporting LPARs. Server operating capabilities describe the computing resources provided by a particular server for hosting an LPAR. For example, server operating capabilities may describe the server's processors, processor utilization, system firmware, storage resources, storage performance, network resources, network performance, computer memory, historical server performance statistics, and so on.

LPAR hosting costs describe monetary costs incurred when a particular server hosts and supports an LPAR. LPAR hosting costs may be represented as the money charged to the owner of the LPAR by the hosting entity providing the server to host the LPAR. The owner of the LPAR is typically an individual, business, or some other organization that creates or commissions the creation of the LPAR to support various objective of the owner. For example, a LPAR owner may create an LPAR to provide web services on the owner's behalf or to establish an e-commerce presence for the owner on the Internet. The hosting entity providing the server to host the LPAR is also typically an individual, business, or some other organization that provides hosting services to LPAR owners. For example, an entity providing servers to host LPARs may be implemented as a business that operates computing datacenters. A hosting entity may set LPAR hosting costs for the servers that the entity operates based in business costs such as, for example, business rents, equipment costs, electricity and other power costs, cooling costs, network access costs, employee costs, and so on.

In the example of FIG. 1, the server computing devices (100) are located in three datacenters (104), each datacenter located in a different geographic area. In particular, datacenter (104a) includes servers (100a, 100b, 100c) and is located in the United States. Datacenter (104b) includes servers (100d, 100e, 100f) and is located in Russia. Datacenter (104c) includes servers (100g, 100h, 100i) and is located in Japan. Each datacenter (104) of FIG. 1 includes an administrative server (106), a computing device that administers the other servers (100) in each datacenter (104). Specifically, datacenter (104a) includes administrative server (106a), datacenter (104b) includes administrative server (106b), and datacenter (104c) includes administrative server (106c). Each administrative server (106) may administer the servers (100) in its respective datacenter (104) by throttling the servers (100) to reduce power consumption, turning some of the servers (100) off or on, moving LPARs from one server to another within the datacenter (104), notifying datacenter personnel of potential or realized server failures, and so on.

In addition to administering servers (100), the administration server (106) for each of the datacenters (104) advertises the LPAR hosting costs and the server operating capabilities associated with the server computing devices located in the datacenter (104) managed by the administrative server (100). Advertising the LPAR hosting costs and the server operating capabilities associated with the server computing devices managed by the administrative server (100) advantageously allows a hosting entity to attract new clients in the form of LPAR owners who need hosting services provided for the owners' LPARs. In the example of FIG. 1, each administration server (106) advertises the LPAR hosting costs and the server operating capabilities through a datacenter broker by registering each server with the datacenter broker and updating the LPAR hosting costs and the server operating capabilities for each server periodically or upon request from the datacenter broker.

The exemplary system of FIG. 1 includes a broker server (128). The broker server (128) is a computing device having installed upon it a datacenter broker (130). The datacenter broker (130) of FIG. 1 is a software component that receives and stores detailed offers of hosting service from datacenters or servers. An LPAR that is willing to move can register that LPAR's customer requirements with the broker (130), which in turn may provide the LPAR with the most advantageous match currently available. In such a manner, the datacenter broker (130) matches the LPAR hosting costs and the server operating capabilities for servers providing hosting services with LPARs having particular LPAR customer requirements. An LPAR may make a singular request for matching servers currently registered with the broker (130), or an LPAR may request that the broker (130) provide alerts to the LPAR on an ongoing basis as new servers or datacenters register with the broker (130).

The LPAR customer requirements for a particular LPAR specify customer criteria for operating the LPAR. Such customer criteria may specify acceptable LPAR hosting costs and server operating capabilities for servers that support the particular LPAR. For example, LPAR customer requirements may specify that the only servers acceptable for hosting a particular LPAR is a server that provides an IBM® POWER6™ architecture with 16 Megabytes of RAM, provides storage space at less than $3 per Gigabyte per month, and provides at least 50 Gigibits per second (Gbit/s) of network bandwidth at less than $50 per month. LPAR's or other software components on behalf of the LPARs may register each LPAR's customer requirements with the datacenter broker (130).

In the example of FIG. 1, the datacenter broker (130) matches the LPAR hosting costs and the server operating capabilities for a server providing hosting services with LPARs having particular LPAR customer requirements using an LPAR table (136) and a datacenter table (146). Each record of the LPAR table (136) associates an identifier (142) for a LPAR with a particular set of LPAR customer requirements (144) for that LPAR. Each record of the datacenter table (146) associates an identifier (148) for a datacenter, an identifier (152) for a server in the datacenter, the LPAR hosting costs (154), and the server operating capabilities (164) for the server. As mentioned above, each datacenters (104) of FIG. 1 may register with the datacenter broker (130) to advertise the operating capabilities and the hosting costs for the servers in that datacenter.

In the exemplary system of FIG. 1, the server (100a) has installed upon it an LPAR (108) and other servers (100) have installed upon them other LPARs (118). Each logical partition (108, 118) provides an execution environment for applications and an operating system. In the example of FIG. 1, the logical partition (108) provides an execution environment for applications (110) and operating system (112). Each application (110) is a set of computer program instructions implementing user-level data processing. The operating system (112) of FIG. 1 is system software that manages the resources allocated to the logical partition (108) by the hypervisor (132a). The operating system (112) performs basic tasks such as, for example, controlling and allocating virtual memory, prioritizing the processing of instructions, controlling virtualized input and output devices, facilitating networking, and managing a virtualized file system.

Each server (100) of FIG. 1 includes a hypervisor (132). Specifically regarding server (100a), the hypervisor (132a) of FIG. 1 is a layer of system software that runs on the computer hardware (114) beneath the operating system layer to allow multiple operating systems to run on a host computer at the same time. The hypervisor (132a) provides the operating system (112) with a set of computer resources using the logical partition (108). As mentioned above, a LPAR is a set of data structures and services provided to a single operating system that enables the operating system to run concurrently with other operating systems on the same computer hardware. In effect, the logical partitions allow the distribution of computer resources within a single computer to make the computer function as if it were two or more independent computers.

The hypervisor (132a) of FIG. 1 establishes each logical partition using a combination of data structures and services provided by the hypervisor (132a) itself along with partition firmware configured for each logical partition. In the example of FIG. 1, the logical partition (108) is configured using partition firmware (120). The partition firmware (120) of FIG. 1 is system software specific to the partition (108) that is often referred to as a 'dispatchable hypervisor.' The partition firmware (120) maintains partition-specific data structures (124) and provides partition-specific services to the operating system (112) through application programming interface ('API') (122). The hypervisor (132*a*) maintains data structures (140) and provides services to the operating systems and partition firmware for each partition through API (134). Collectively, the hypervisor (132*a*) and the partition firmware (120) are referred to in this specification as 'firmware' because both the hypervisor (132*a*) and the partition firmware (120) are typically implemented as firmware. Together the hypervisor and the partition firmware enforce logical partitioning between one or more operating systems by storing state values in various hardware registers and other structures, which define the boundaries and behavior of the logical partitions. Using such state data, the hypervisor (132*a*) and the partition firmware may allocate memory to logical partitions, route input/output between input/output devices and associated logical partitions, provide processor-related services to logical partition, and so on. Essentially, this state data defines the allocation of resources in logical partitions, and the allocation is altered by changes the state data rather than by physical reconfiguration of hardware.

In order to allow multiple operating systems to run at the same time, the hypervisor (132*a*) assigns virtual processors (150) to the operating systems running in the logical partition (108) and schedules virtual processors (150) on one or more physical processors (156) of the server (100*a*). A virtual processor is a subsystem that implements assignment of processor time to a logical partition. A shared pool of physical processors (156) supports the assignment of partial physical processors (in time slices) to each logical partition. Such partial physical processors shared in time slices are referred to as 'virtual processors.' A thread of execution is said to run on a virtual processor when it is running on the virtual processor's time slice of the physical processors. Sub-processor partitions time-share a physical processor among a set of virtual processors, in a manner that is invisible to an operating system running in a logical partition. Unlike multiprogramming within the operating system where a thread can remain in control of the physical processor by running the physical processor in interrupt-disabled mode, in sub-processor partitions, the thread is still pre-empted by the hypervisor (132*a*) at the end of its virtual processor's time slice, in order to make the physical processor available to a different virtual processor.

The hypervisor (132*a*) of FIG. 1 also includes a data communications subsystem (138). The data communications subsystem (138) of FIG. 1 implements data communication with other computing devices connected to the server (100*a*) such as, for example, storage devices or other servers.

In the description of the exemplary system with reference to FIG. 1, the details of LPARs (118) and of the other hypervisors (132*b*, 132*c*) configured on servers in datacenters (104*b*, 104*c*) are omitted for clarity. Readers will note, however, that the LPARs (118) and the other hypervisors (132*b*, 132*c*) may be structured and may operate in a manner similar to LPAR (108) and hypervisor (132*a*) configured on server (100*a*) in datacenter (104*a*).

In the exemplary system of FIG. 1, the logical partition (108*a*) includes a migration manager (102). The migration manager (102) is a set of computer program instructions for transferring the LPAR (108) between two server computing devices based on LPAR customer requirements according to embodiments of the present invention. The migration manager (102) generally operates to transfer the LPAR (108) between two server computing devices based on LPAR customer requirements according to embodiments of the present invention by: identifying LPAR customer requirements for the LPAR (108), the LPAR customer requirements specifying customer criteria for operating the LPAR (108); selecting, from among the plurality of server computing devices (100), a server computing device to which to migrate the LPAR (108) in dependence upon the server operating capabilities and LPAR hosting costs for at least one of the server computing devices (100) and the LPAR customer requirements for the LPAR (108); and migrating the LPAR (108) to the selected server computing device. Although FIG. 1 illustrates the migration manager (102) in the logical partition (108), readers will note that such an example is for explanation and not for limitation. In fact, the migration manager (102) may be executed from any computing device network connected to the server (100*a*) on which the LPAR (108) is configured.

Transferring an LPAR between two server computing devices based on LPAR customer requirements in accordance with the present invention is generally implemented with computers, that is, with automated computing machinery. In FIG. 1, for example, the servers, administrative servers, and the broker server are implemented to some extent at least as computers. For further explanation, therefore, FIG. 2 sets forth a block diagram of automated computing machinery comprising an exemplary server computing device (100) useful in transferring an LPAR between two server computing devices based on LPAR customer requirements according to embodiments of the present invention. The computing system (100) of FIG. 2 includes at least one computer processor (156) or 'CPU' as well as random access memory (168) ('RAM') which is connected through a high speed memory bus (166) and bus adapter (158) to processor (156) and to other components of the computing system.

Stored in RAM (168) are logical partitions (108) and a hypervisor (132) that exposes an API (134). Each logical partition (108) is a set of data structures and services that enables distribution of computer resources within a single computer to make the computer function as if it were two or more independent computers. Logical partition (108*a*) includes application (110), an operating system (112), and partition firmware that exposes an API (122). Operating systems useful in computing systems according to embodiments of the present invention include UNIX™, Linux™, Microsoft Vista™ IBM's AIX™, IBM's i5/OS™, and others as will occur to those of skill in the art.

Figure 2:
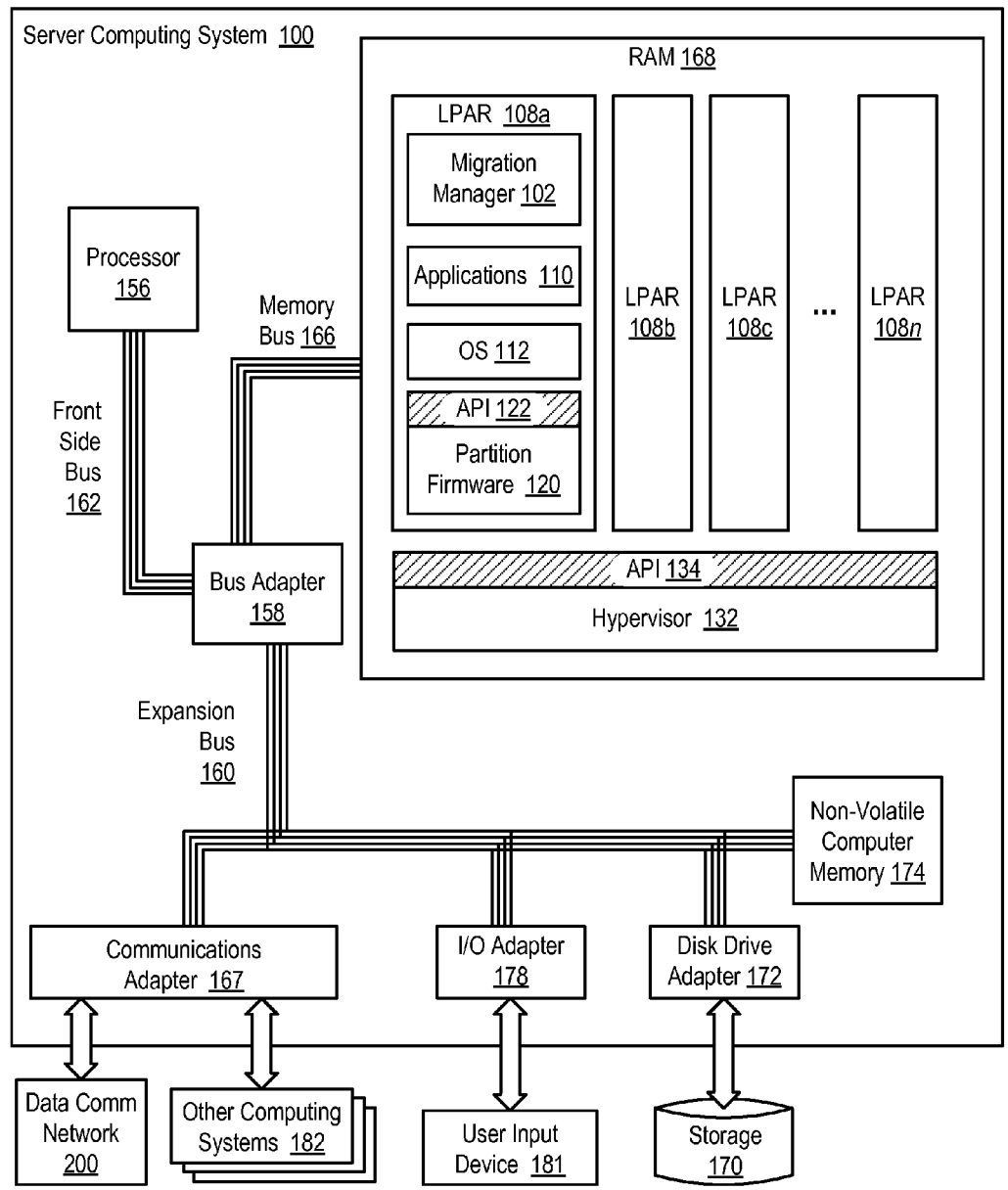
FIG. 2 sets forth a block diagram of automated computing machinery comprising an exemplary server computing system useful in transferring a LPAR between two server computing devices based on LPAR customer requirements according to embodiments of the present invention.

In the example of FIG. 2, the logical partition (108*a*) includes a migration manager (102). The migration manager (102) of FIG. 2 is a set of computer program instructions for transferring a LPAR between two of a plurality of server computing devices based on LPAR customer requirements according to embodiments of the present invention. The migration manager (102) of FIG. 2 operates generally for transferring a LPAR between two of a plurality of server computing devices based on LPAR customer requirements according to embodiments of the present invention by: identifying LPAR customer requirements for the LPAR (108*a*), the LPAR customer requirements specifying customer criteria for operating the LPAR (108*a*); selecting, from among the plurality of server computing devices, a server computing device to which to migrate the LPAR (108*a*) in dependence upon the server operating capabilities and LPAR hosting costs for at least one of the server computing devices and the LPAR customer requirements for the LPAR (108a); and migrating the LPAR (108a) to the selected server computing device.

The hypervisor (132) and the logical partitions (108), including migration manager (102), applications (110), the operating system (112), the partition firmware (120) illustrated in FIG. 2 are software components, that is computer program instructions and data structures, that operate as described above with reference to FIG. 1. The hypervisor (132) and the logical partitions (108), including memory balancing module (102), applications (110), the operating system (112), the partition firmware (120) in the example of FIG. 2 are shown in RAM (168), but many components of such software typically are stored in non-volatile computer memory (174) or computer storage (170).

The exemplary computing system (100) of FIG. 2 includes bus adapter (158), a computer hardware component that contains drive electronics for high speed buses, the front side bus (162) and the memory bus (166), as well as drive electronics for the slower expansion bus (160). Examples of bus adapters useful in computing systems useful according to embodiments of the present invention include the Intel Northbridge, the Intel Memory Controller Hub, the Intel Southbridge, and the Intel I/O Controller Hub. Examples of expansion buses useful in computing systems useful according to embodiments of the present invention may include Peripheral Component Interconnect ('PCI') buses and PCI Express ('PCIe') buses.

Although not depicted in the exemplary computing system (100) of FIG. 2, the bus adapter (158) may also include drive electronics for a video bus that supports data communication between a video adapter and the other components of the computing system (100). FIG. 2 does not depict such video components because a server computing system is often implemented as a blade server installed in a server chassis or a node in a parallel computer with no dedicated video support. Readers will note, however, that computing systems useful in embodiments of the present invention may include such video components.

The exemplary computing system (100) of FIG. 2 also includes disk drive adapter (172) coupled through expansion bus (160) and bus adapter (158) to processor (156) and other components of the exemplary computing system (100). Disk drive adapter (172) connects non-volatile data storage to the exemplary computing system (100) in the form of disk drive (170). Disk drive adapters useful in computing systems include Integrated Drive Electronics ('IDE') adapters, Small Computer System Interface ('SCSI') adapters, and others as will occur to those of skill in the art. In the exemplary computing system (100) of FIG. 2, non-volatile computer memory (174) is connected to the other components of the computing system (100) through the bus adapter (158). In addition, the non-volatile computer memory (174) may be implemented for a computing system as an optical disk drive, electrically erasable programmable read-only memory (so-called 'EEPROM' or 'Flash' memory), RAM drives, and so on, as will occur to those of skill in the art.

The exemplary computing system (100) of FIG. 2 includes one or more input/output ('I/O') adapters (178). I/O adapters in computing systems implement user-oriented input/output through, for example, software drivers and computer hardware for controlling output to display devices such as computer display screens, as well as user input from user input devices (181) such as keyboards and mice. Although not depicted in the example of FIG. 2, computing systems in other embodiments of the present invention may include a video adapter, which is an example of an I/O adapter specially designed for graphic output to a display device such as a display screen or computer monitor. A video adapter is typically connected to processor (156) through a high speed video bus, bus adapter (158), and the front side bus (162), which is also a high speed bus.

The exemplary computing system (100) of FIG. 2 includes a communications adapter (167) for data communications with other computing systems (182) and for data communications with a data communications network (200). Such data communications may be carried out through Ethernet connections, through external buses such as a Universal Serial Bus ('USB'), through data communications networks such as IP data communications networks, and in other ways as will occur to those of skill in the art. Communications adapters implement the hardware level of data communications through which one computing system sends data communications to another computing system, directly or through a data communications network. Examples of communications adapters useful for transferring a LPAR between two server computing devices based on LPAR customer requirements according to embodiments of the present invention include modems for wired dial-up communications, IEEE 802.3 Ethernet adapters for wired data communications network communications, and IEEE 802.11b adapters for wireless data communications network communications.

Figure 3:
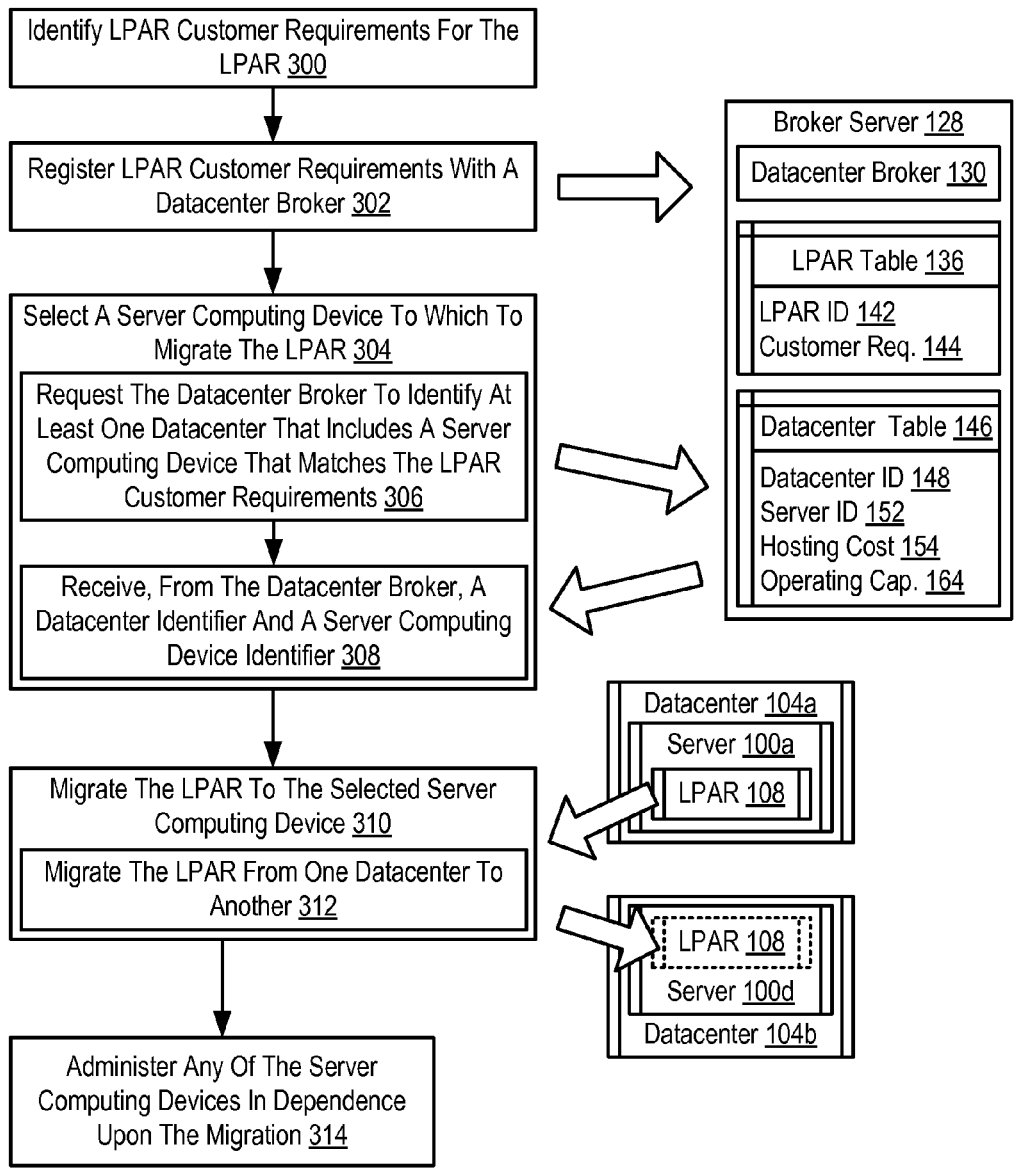
FIG. 3 sets forth a flow chart illustrating an exemplary method for transferring a LPAR between two server computing devices based on LPAR customer requirements according to embodiments of the present invention.

For further explanation, FIG. 3 sets forth a flow chart illustrating an exemplary method for transferring a LPAR (108) between two server computing devices (100a, 100d) based on LPAR customer requirements according to embodiments of the present invention. The server computing devices (100) of FIG. 3 are connected together through a data communications network. Each server computing device (100) has server operating capabilities and is associated with LPAR hosting costs for supporting LPARs. In the example of FIG. 3, the server computing devices (100) are located in two datacenters (104)—server (100a) is located in datacenter (104a), and server (100d) is located in datacenter (104b). Each datacenter (104) located in a different geographic area and advertises the LPAR hosting costs and the server operating capabilities associated with the server computing devices located in that datacenter.

In the example of FIG. 3, the LPAR (108) is installed on server computing device (100a). The LPAR (108) of FIG. 3 was created by the LPAR's owner, that is an individual, business, or other organization. The owner may have designed and created the LPAR (108) itself or commissioned some other individual or entity to design and create the LPAR (108) on the owner's behalf. At some previous time, the owner may have arranged for the datacenter (104a) to host the LPAR (108) using the datacenter's server (100a). The LPAR (108) may have migrated to the server (100a) from some other server or datacenter or the LPAR owner may have initially configured the LPAR (108) on server (100a). While operating on server (100a), a migration manager for the LPAR (108) seeks out opportunities to transfer the LPAR (108) to another server computing device that provides a combination of operating capabilities and hosting costs within the LPAR's customer requirements.

The method of FIG. 3 includes identifying (300) LPAR customer requirements for the LPAR (108). Identifying (300) LPAR customer requirements for the LPAR (108) according to the method of FIG. 3 may be carried out by retrieving the LPAR customer requirements from a data structure in the LPAR (108) itself. In some other embodiments, identifying (300) LPAR customer requirements for the LPAR (108) according to the method of FIG. 3 may be carried out by retrieving the LPAR customer requirements from some location specified by the LPAR (108).

In the example of FIG. 3, the LPAR customer requirements specify customer criteria for operating the LPAR (108). As mentioned above, customer criteria may specify acceptable LPAR hosting costs and server operating capabilities for servers that support the particular LPAR. For example, LPAR customer requirements may specify that the only servers acceptable for hosting a particular LPAR is a server that provides an IBM® POWER6™ architecture with 16 Megabytes of RAM, provides storage space at less than $3 per Gigabyte per month, and provides at least 50 Gigibits per second (Gbit/s) of network bandwidth at less than $50 per month. LPAR's or other software components on behalf of the LPARs may register each LPAR's customer requirements with the datacenter broker (130). Customer criteria may also specify rules that narrow a list of servers down to a single server to which to migrate the LPAR (108) when more than one server is capable of providing acceptable server operating capabilities and LPAR hosting costs. For example, if more than one server is capable of providing acceptable server operating capabilities and LPAR hosting costs, then LPAR customer requirements may dictate that the server selected for migration is the server having the lowest monetary cost per hour or the server having the closest geographic proximity to the LPAR owner's location.

The method of FIG. 3 also includes registering (302) LPAR customer requirements with a datacenter broker (130) installed on a broker server (128). Registering (302) LPAR customer requirements with a datacenter broker (130) according to the method of FIG. 3 may be carried out by transmitting to the datacenter broker (130) a registration request that encapsulates the LPAR customer requirements. In turn, the datacenter broker (130) associates the LPAR customer requirements (144) with an identifier (142) for the LPAR registering those LPAR customer requirements. Registering (302) LPAR customer requirements with a datacenter broker (130) according to the method of FIG. 3 may further be carried out by receiving from the datacenter broker (130) an acknowledgement message indicating that that registration was successful.

The method of FIG. 3 also includes selecting (304), from among the plurality of server computing devices, a server computing device to which to migrate the LPAR (108) in dependence upon the server operating capabilities and LPAR hosting costs for at least one of the server computing devices and the LPAR customer requirements for the LPAR (108). Selecting (304), from among the plurality of server computing devices, a server computing device to which to migrate the LPAR (108) according to the method of FIG. 3 includes requesting (306) the datacenter broker (130) to identify at least one datacenter that includes a server computing device having the server operating capabilities and the LPAR hosting costs that match the LPAR customer requirements for that LPAR (108). The request sent to datacenter broker (130) may be a request for a one-time query regarding whether any other servers are acceptable for hosting the LPAR (108) or may be a request that the datacenter broker (130) continuously monitor datacenters for acceptable servers on which to host the LPAR (108). Upon receiving the request, the datacenter broker (130) identifies servers acceptable for hosting the LPAR (108) by retrieving the LPAR customer requirements (144) for the LPAR (108) from the LPAR table (136) based on the identifier (142) for LPAR (108) and traversing the datacenter table (146) for servers whose hosting costs (154) and operating capabilities (164) match the LPAR customer requirements (144).

Selecting (304), from among the plurality of server computing devices, a server computing device to which to migrate the LPAR (108) according to the method of FIG. 3 is then carried out by receiving (308), from the datacenter broker in response to the request, a datacenter identifier and a server computing device identifier. Receiving (308), from the datacenter broker in response to the request, a datacenter identifier and a server computing device identifier according to the method of FIG. 3 may be carried out by receiving a response message from the datacenter broker (130) and unencapsulating the datacenter identifier and a server computing device identifier for the server having acceptable operating capabilities and hosting costs for hosting the LPAR (108). For example, in FIG. 3, the datacenter broker (130) identifies server (100d) and provides an identifier for server (100d) and an identifier for datacenter (104b).

The method of FIG. 3 also includes migrating (310) the LPAR (108) to the selected server computing device (100d). Migrating (310) the LPAR (108) to the selected server computing device (100d) according to the method of FIG. 3 includes migrating (312) the LPAR from one of the datacenters (104a) to another datacenter (104b). Migrating (310) the LPAR (108) to the selected server computing device (100d) according to the method of FIG. 3 may be carried out by communicating with an administrative server for the datacenter (104b) using a pre-established migration protocol to provide billing information and receive migration information for the datacenter (104b). The billing information provided to an administrative server for the datacenter (104b) may be stored in the LPAR (108) itself or at some other location specified by the LPAR (108). The migration information received from the datacenter (104b) may include port information and security credentials used by a hypervisor on the server (100a) to migrate the LPAR (108) to a hypervisor installed on server (100d). Migrating (310) the LPAR (108) to the selected server computing device (100d) according to the method of FIG. 3 may further be carried out by copying the LPAR (108) on the server (100a), include all LPAR storage, LPAR register values, data structure values, dirty pages in RAM, and so on, to the server (100d) in datacenter (104b).

Because migrating an LPAR from one server to another changes the workload for the servers in the various datacenters, the method of FIG. 3 includes administering (314) any of the plurality of server computing devices (100) in dependence upon the migration of the LPAR (108) to the selected server computing device (100d). Administering (314) any of the plurality of server computing devices (100) in dependence upon the migration of the LPAR (108) to the selected server computing device (100d) according to the method of FIG. 3 may be carried out by an administration server in one or more of the datacenters. The administration server may administer (314) a server according to the method of FIG. 3 by reducing the operating speeds of the servers who have less LPARs to host due to the migration and increasing the operating speeds of the server who have more LPARs to host due to the migration. Dynamically adjusting the operating speeds of servers as the servers' workloads changes allows datacenters to reduce operating costs when feasible and only increase those costs when necessary. The administration server may also administer (314) a server according to the method of FIG. 3 by reconfiguring the LPARs on the various servers within a particular datacenter. For example, because server (100a) has one less LPAR to host after the migration, the administration server for datacenter (104a) may be able to shuffle the remaining LPARs on server (100a)

to other servers within the datacenter (104a) and shut down server (104a) to reduce the datacenter's overall operating costs.

Figure 4:
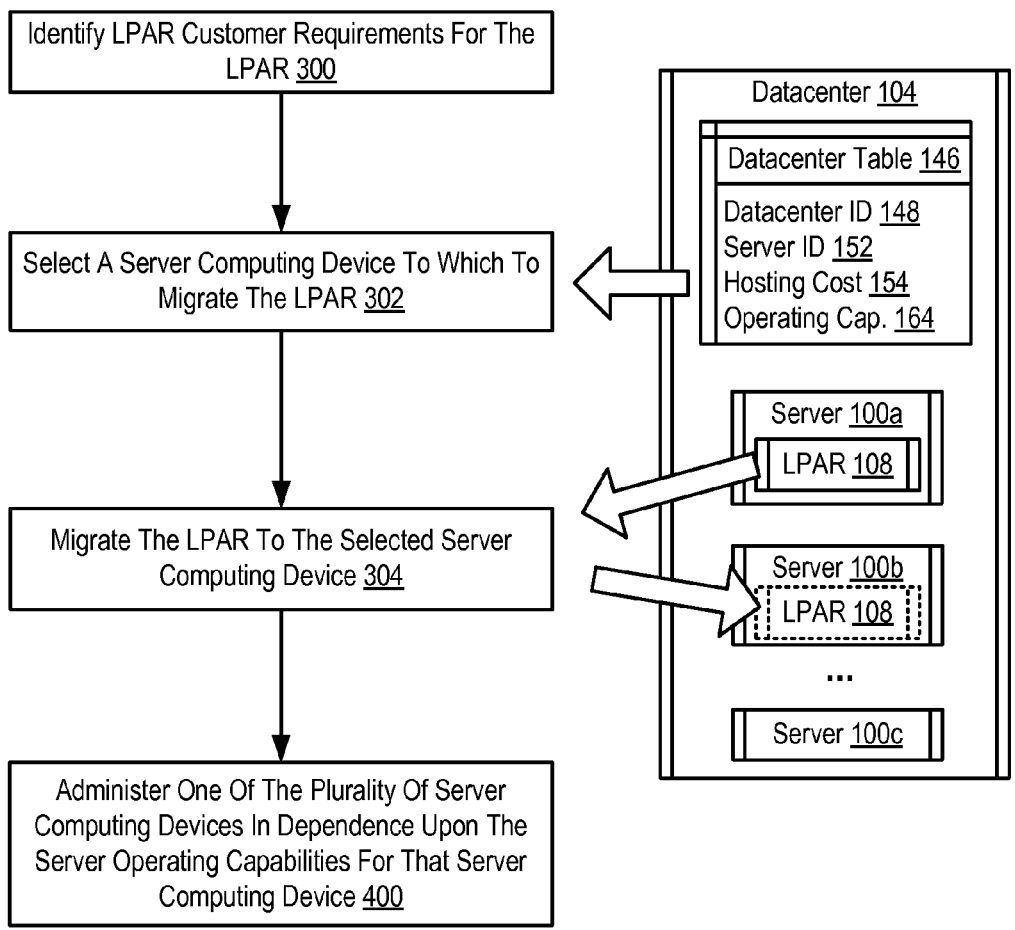
FIG. 4 sets forth a flow chart illustrating a further exemplary method for transferring a LPAR between two server computing devices based on LPAR customer requirements according to embodiments of the present invention.

The description above with reference to FIG. 3 describes the transfer of an LPAR from a server in one datacenter to a server another datacenter to reduce the costs of hosting the LPAR for the LPAR's owner. In some other embodiments, a hosting entity, such as a datacenter, may transfer an LPAR from one server to another server within the datacenter to reduce overall operating costs for the datacenter. For further explanation, therefore, FIG. 4 sets forth a flow chart illustrating a further exemplary method for transferring a LPAR (108) between two server computing devices (100) based on LPAR customer requirements according to embodiments of the present invention. The server computing devices (100) of FIG. 4 are connected together through a data communications network. Each server computing device (100) has server operating capabilities and is associated with LPAR hosting costs for supporting LPARs. In the example of FIG. 4, the server computing devices (100) are located in the same datacenters (104).

In the example of FIG. 4, the LPAR (108) is installed on server computing device (100a). In a manner similar to the example of FIG. 3, the LPAR (108) of FIG. 4 was created by the LPAR's owner, that is an individual, business, or other organization. The owner may have designed and created the LPAR (108) itself or commissioned some other individual or entity to design and create the LPAR (108) on the owner's behalf. At some previous time, the owner may have arranged for the datacenter (104a) to host the LPAR (108) using the datacenter's server (100a). The LPAR (108) may have migrated to the server (100a) from some other server or datacenter or the LPAR owner may have initially configured the LPAR (108) on server (100a). While the LPAR (108) is hosted by the datacenter (104), the datacenter (104) may transfer the LPAR (108) from one server to another within the datacenter (104) to reduce overall operating costs for the datacenter (104).

The method of FIG. 4 includes identifying (300) LPAR customer requirements for the LPAR (108). Identifying (300) LPAR customer requirements for the LPAR (108) according to the method of FIG. 4 may be carried out by retrieving the LPAR customer requirements from a data structure in the LPAR (108) itself. In some other embodiments, identifying (300) LPAR customer requirements for the LPAR (108) according to the method of FIG. 4 may be carried out by retrieving the LPAR customer requirements from some location specified by the LPAR (108).

The method of FIG. 4 also includes selecting (304), from among the plurality of server computing devices, a server computing device to which to migrate the LPAR (108) in dependence upon the server operating capabilities and LPAR hosting costs for at least one of the server computing devices and the LPAR customer requirements for the LPAR (108). Selecting (304), from among the plurality of server computing devices, a server computing device to which to migrate the LPAR (108) according to the method of FIG. 4 may be carried out by identifying from the datacenter table (146) servers whose hosting costs (154) and operating capabilities (164) match the LPAR customer requirements (144) and selecting, from the identified servers, a server for the migration according to datacenter cost reduction rules that allow the datacenter to operate at the lowest overall operating cost. Datacenter cost reduction rules specify criteria used to identify which server that the LPAR (108) should be migrated to in order to minimize the overall operation costs of the datacenter. For example, if the datacenter servers that are turned on have enough capacity to support the LPAR being migrated, then datacenter cost reduction rules may specify migrating an LPAR to one of the server's already turned on as opposed to turning on another server in the datacenter to host the LPAR (108). In such a manner, the overall operating costs of the datacenter are reduced because an additional server that requires power and cooling is not turned on. For further example, datacenter cost reductions rules may also specify migrating the LPAR to the datacenter's server that has enough excess processing capacity to support all of the LPARs in the datacenter as opposed to migrating the LPAR to another server only having enough excess processing capacity to support a portion of the LPARs in the datacenter. In such an example, migrating all the LPARs to the server that has enough excess processing capacity to support all of the LPARs in a datacenter allows a datacenter administration server to power off all of the other servers to save operating costs.

The method of FIG. 4 includes migrating (310) the LPAR (108) to the selected server computing device (100d). Migrating (310) the LPAR (108) to the selected server computing device (1 OOd) according to the method of FIG. 4 may be carried out by copying the LPAR (108) on the server (100a), include all LPAR storage, LPAR register values, data structure values, dirty pages in RAM, and so on, to the server (100b).

Because the workload on the servers (100) in the datacenter (104) changes dynamically as the servers (100) various LPARs, an administrative server in the datacenter (104) may administer the servers (100) from time to time to further reduce the overall operating costs for the datacenter. The method of FIG. 4 therefore includes administering (400) one of the plurality of server computing devices (100) in dependence upon the server operating capabilities for that server computing device. Administering (400) one of the plurality of server computing devices (100) in dependence upon the server operating capabilities for that server computing device according to the method of FIG. 4 may be carried out by identifying servers in the datacenter (104) that have excess processing capacity and reducing the operating speed for those servers to reduce the amount of power the servers consume. For example, if a server in the datacenter is only utilizing fifty percent of its computing resources, then an administrative server for the datacenter may instruct the processor and various server subsystems to operate at a slower speed to reduce power and cooling costs for the datacenter.

Exemplary embodiments of the present invention are described largely in the context of a fully functional computer system for transferring a LPAR between two server computing devices based on LPAR customer requirements. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of transferring a logical partition ('LPAR') between two of a plurality of server computing devices based on LPAR customer requirements, the plurality of server computing devices connected together through a data communications network, the LPAR installed on one of the plurality of server computing devices, each server computing device having server operating capabilities, each server computing device associated with LPAR hosting costs for supporting LPARs, the method comprising:
   identifying LPAR customer requirements for the LPAR, the LPAR customer requirements specifying customer criteria for operating the LPAR;
   selecting, from among the plurality of server computing devices, a server computing device to which to migrate the LPAR in dependence upon the server operating capabilities and LPAR hosting costs for at least one of the server computing devices and the LPAR customer requirements for the LPAR; and
   migrating the LPAR to the selected server computing device.

2. The method of claim 1 further comprising administering any of the plurality of server computing devices in dependence upon the migration of the LPAR to the selected server computing device.

3. The method of claim 1 further comprising administering one of the plurality of server computing devices in dependence upon the server operating capabilities for that server computing device.

4. The method of claim 1 wherein:
   the plurality of server computing devices are located in at least two datacenters, each datacenter located in a different geographic area; and
   migrating the LPAR to the selected server computing device further comprises migrating the LPAR from one of the datacenters to another datacenter.

5. The method of claim 1 wherein the plurality of server computing devices are located in at least two datacenters, each datacenter located in a different geographic area, each datacenter advertising the LPAR hosting costs and the server operating capabilities associated with the server computing devices located in that datacenter.

6. The method of claim 5 wherein:
   the method further comprises registering the LPAR customer requirements for the LPAR with a datacenter broker; and
   selecting, from among the plurality of server computing devices, a server computing device to which to migrate the LPAR further comprises:
   requesting the datacenter broker to identify at least one datacenter that includes a server computing device having the server operating capabilities and the LPAR hosting costs that match the LPAR customer requirements for that LPAR, and
   receiving, from the datacenter broker in response to the request, a datacenter identifier and a server computing device identifier.

7. A system for transferring a logical partition ('LPAR') between two of a plurality of server computing devices based on LPAR customer requirements, the plurality of server computing devices connected together through a data communications network, the LPAR installed on one of the plurality of server computing devices, each server computing device having server operating capabilities, each server computing device associated with LPAR hosting costs for supporting LPARs, the system comprising one or more computer processors, computer memory operatively coupled to the computer processors, the computer memory having disposed within it computer program instructions capable of:
   identifying LPAR customer requirements for the LPAR, the LPAR customer requirements specifying customer criteria for operating the LPAR;
   selecting, from among the plurality of server computing devices, a server computing device to which to migrate the LPAR in dependence upon the server operating capabilities and LPAR hosting costs for at least one of the server computing devices and the LPAR customer requirements for the LPAR; and
   migrating the LPAR to the selected server computing device.

8. The system of claim 7 wherein the computer memory has disposed within it computer program instructions capable of administering any of the plurality of server computing devices in dependence upon the migration of the LPAR to the selected server computing device.

9. The system of claim 7 wherein the computer memory has disposed within it computer program instructions capable of administering one of the plurality of server computing devices in dependence upon the server operating capabilities for that server computing device.

10. The system of claim 7 wherein:
   the plurality of server computing devices are located in at least two datacenters, each datacenter located in a different geographic area; and
   migrating the LPAR to the selected server computing device further comprises migrating the LPAR from one of the datacenters to another datacenter.

11. The system of claim 7 wherein the plurality of server computing devices are located in at least two datacenters, each datacenter located in a different geographic area, each datacenter advertising the LPAR hosting costs and the server operating capabilities associated with the server computing devices located in that datacenter.

12. The system of claim 11 wherein:
   the computer memory has disposed within it computer program instructions capable of registering the LPAR customer requirements for the LPAR with a datacenter broker; and
   selecting, from among the plurality of server computing devices, a server computing device to which to migrate the LPAR further comprises:
   requesting the datacenter broker to identify at least one datacenter that includes a server computing device having the server operating capabilities and the LPAR hosting costs that match the LPAR customer requirements for that LPAR, and receiving, from the datacenter broker in response to the request, a datacenter identifier and a server computing device identifier.

13. A computer program product for transferring a logical partition ('LPAR') between two of a plurality of server computing devices based on LPAR customer requirements, the plurality of server computing devices connected together through a data communications network, the LPAR installed on one of the plurality of server computing devices, each server computing device having server operating capabilities, each server computing device associated with LPAR hosting costs for supporting LPARs, the computer program product comprising:

a non-transitory computer readable medium and computer program instructions stored on the non-transitory computer readable medium, wherein the computer program instructions, when executed, cause a computer to carry out the steps of:

identifying LPAR customer requirements for the LPAR, the LPAR customer requirements specifying customer criteria for operating the LPAR;

selecting, from among the plurality of server computing devices, a server computing device to which to migrate the LPAR in dependence upon the server operating capabilities and LPAR hosting costs for at least one of the server computing devices and the LPAR customer requirements for the LPAR; and migrating the LPAR to the selected server computing device.

14. The computer program product of claim 13 further comprising computer program instructions that, when executed, cause the computer to carry out the steps of administering any of the plurality of server computing devices in dependence upon the migration of the LPAR to the selected server computing device.

15. The computer program product of claim 13 further comprising computer program instructions that, when executed, cause the computer to carry out the steps of administering one of the plurality of server computing devices in dependence upon the server operating capabilities for that server computing device.

16. The computer program product of claim 13 wherein:

the plurality of server computing devices are located in at least two datacenters, each datacenter located in a different geographic area; and migrating the LPAR to the selected server computing device further comprises migrating the LPAR from one of the datacenters to another datacenter.

17. The computer program product of claim 13 wherein the plurality of server computing devices are located in at least two datacenters, each datacenter located in a different geographic area, each datacenter advertising the LPAR hosting costs and the server operating capabilities associated with the server computing devices located in that datacenter.

18. The computer program product of claim 17 wherein:

the computer program product further comprises computer program instructions that, when executed, cause the computer to carry out the steps of registering the LPAR customer requirements for the LPAR with a datacenter broker; and selecting, from among the plurality of server computing devices, a server computing device to which to migrate the LPAR further comprises:

requesting the datacenter broker to identify at least one datacenter that includes a server computing device having the server operating capabilities and the LPAR hosting costs that match the LPAR customer requirements for that LPAR, and receiving, from the datacenter broker in response to the request, a datacenter identifier and a server computing device identifier.

19. The computer program product of claim 13 wherein the computer readable medium comprises a recordable medium.

\* \* \* \* \*